(12) United States Patent
Starsinic et al.

(10) Patent No.: US 10,165,389 B2
(45) Date of Patent: Dec. 25, 2018

(54) SERVICE CAPABILITY SERVER (SCS) TERMINATED SHORT MESSAGE SERVICE (SMS) SYSTEMS AND METHODS

(71) Applicant: IOT HOLDINGS, INC., Wilmington, DE (US)

(72) Inventors: Michael F. Starsinic, Newtown, PA (US); Kamel M. Shaheen, State College, PA (US); Dale N. Seed, Allentown, PA (US); Behrouz Aghili, Commack, NY (US); Ulises Olvera-Hernandez, Montreal (CA); Peter S. Wang, E. Setauket, NY (US); Dorothy Gellert, Mountain View, CA (US); Debjani Majumder, Bangalore (IN)

(73) Assignee: IOT Holdings, Inc., Wilmington, DE (US)

( * ) Notice: Subject to any disclaimer, the term of this patent is extended or adjusted under 35 U.S.C. 154(b) by 0 days.

(21) Appl. No.: 15/299,154

(22) Filed: Oct. 20, 2016

(65) Prior Publication Data
US 2017/0041735 A1  Feb. 9, 2017

Related U.S. Application Data

(63) Continuation of application No. 13/891,634, filed on May 10, 2013, now Pat. No. 9,503,869.
(Continued)

(51) Int. Cl.
*H04W 4/00* (2009.01)
*H04W 4/14* (2009.01)
(Continued)

(52) U.S. Cl.
CPC ............. *H04W 4/005* (2013.01); *H04L 51/38* (2013.01); *H04L 61/1588* (2013.01);
(Continued)

(58) Field of Classification Search
CPC ......... H04W 4/005; H04W 4/12; H04W 4/14; H04W 80/04; H04L 61/1588; H04L 51/38
(Continued)

(56) References Cited

U.S. PATENT DOCUMENTS 7,177,641 B1   2/2007  Miernik et al.
8,289,937 B2  10/2012  Verma et al.
(Continued)

FOREIGN PATENT DOCUMENTS

| TW | 201214993 A | 4/2012 |
| WO | WO 2012-015902 A1 | 2/2012 |
| WO | 13166230 A2 | 11/2013 |

OTHER PUBLICATIONS

3rd Generation Partnership Project (3GPP), S2-113128 (revision of S2-11xxxx), "Device Triggering and MT Communication", Huawei, Hisilicon, SA WG2 Meeting #86, Naantali, Finland, Jul. 11-15, 2011, pp. 1-4.
(Continued)

*Primary Examiner* — William Nealon
(74) *Attorney, Agent, or Firm* — Volpe and Koenig, P.C.

(57) ABSTRACT

Systems, methods, and instrumentalities are provided to determine routing associated with a short message. A SMS-SC may send a first routing request to a home subscriber server (HSS). The first routing request may be associated with the short message. The SMS-SC may receive a first routing reply. The first routing reply may include one of an indication that the short message is associated with a service capability server (SCS) or a first control plane routing associated with the short message. The SMS-SC may send
(Continued)

the short message to an SCS serving node. The first routing reply may include the indication that the short message is associated with a service capability server (SCS). The SMS-SC may send a second routing request to a SCS subscription database. The SMS-SC may receive a second routing reply from the SCS subscription database, which may indicate a second control plane routing for the short message.

16 Claims, 14 Drawing Sheets

Related U.S. Application Data

(60) Provisional application No. 61/645,834, filed on May 11, 2012.

(51) Int. Cl.
*H04L 12/58* (2006.01)
*H04L 29/12* (2006.01)
*H04W 8/04* (2009.01)
*H04W 4/70* (2018.01)
*H04W 80/04* (2009.01)

(52) U.S. Cl.
CPC ............... *H04W 4/14* (2013.01); *H04W 4/70* (2018.02); *H04W 8/04* (2013.01); *H04W 80/04* (2013.01)

(58) Field of Classification Search
USPC ......................................................... 455/466
See application file for complete search history.

(56) References Cited

U.S. PATENT DOCUMENTS

| | | | | |
|---|---|---|---|---|
| 2002/0089949 | A1* | 7/2002 | Bjelland | H04W 24/02 370/331 |
| 2004/0156355 | A1* | 8/2004 | Stumpert | H04W 76/022 370/352 |
| 2008/0125152 | A1 | 5/2008 | Hou | |
| 2008/0181382 | A1 | 7/2008 | Lean et al. | |
| 2008/0186921 | A1 | 8/2008 | Long et al. | |
| 2010/0054220 | A1 | 3/2010 | Bischinger et al. | |
| 2010/0120455 | A1* | 5/2010 | Aghili | H04L 12/5895 455/466 |
| 2010/0210292 | A1 | 8/2010 | Nooren et al. | |
| 2011/0075675 | A1 | 3/2011 | Koodli et al. | |
| 2011/0185237 | A1 | 7/2011 | Mahdi et al. | |
| 2011/0280383 | A1 | 11/2011 | Varga et al. | |
| 2012/0155389 | A1* | 6/2012 | McNamee | H04L 45/306 370/328 |
| 2012/0282956 | A1 | 11/2012 | Kim et al. | |
| 2012/0294236 | A1* | 11/2012 | Watfa | H04W 60/04 370/328 |
| 2013/0115983 | A1 | 5/2013 | Ronneke et al. | |
| 2013/0155920 | A1 | 6/2013 | Lim et al. | |
| 2013/0155954 | A1 | 6/2013 | Wang et al. | |
| 2013/0279458 | A1 | 10/2013 | Farkas et al. | |
| 2014/0133399 | A1 | 5/2014 | Kim et al. | |
| 2014/0185522 | A1 | 7/2014 | Xu | |
| 2014/0317195 | A1* | 10/2014 | Xu | H04W 4/005 709/204 |
| 2015/0215725 | A1 | 7/2015 | Xu | |

OTHER PUBLICATIONS

3rd Generation Partnership Project (3GPP), S2-120831, "OMA WAP Push Model as Inspiration for MTC Device Triggering Models", LG Electronics, SA WG2 Meeting #89, Vancouver, Canada, Feb. 6-10, 2012, 1-3.

3rd Generation Partnership Project (3GPP), S2-120968, "Network Provided Location Information in IMS", ST-Ericsson, SA WG2 Meeting #89, Vancouver, Canada, Feb. 6-10, 2012, 13 pages.

3rd Generation Partnership Project (3GPP), S2-121339, "Clarifications on Device Triggering", ZTE, SA WG2 Meeting #90, Bratislava, Slovakia, Apr. 16-20, 2012, 8 pages.

3rd Generation Partnership Project (3GPP), TD S2-120711, "Reverse Trigger Flow", Huawei, Hisilicon, TSG SA WG2 Meeting #89, Vancouver, Canada, Feb. 6-10, 2012, 3 pages.

3rd Generation Partnership Project (3GPP), TR 23.888 V1.6.1, "Technical Specification Group Services and System Aspects, System Improvements for Machine-Type Communications (Release 11)", Feb. 2012, pp. 1-166.

3rd Generation Partnership Project (3GPP), TR 29.818 V0.1.1, "Technical Specification Group Core Network and Terminals, Study on the Enhancement of Protocols for SMS Service Over SGs, (Release 11 )", Mar. 2012, pp. 1-26.

3rd Generation Partnership Project (3GPP), TS 22.368 V11.3.0, "Technical Specification Group Services and System Aspects, Service Requirements for Machine-Type Communications (MTC), Stage 1 (Release 11 )", Sep. 2011, pp. 1-24.

3rd Generation Partnership Project (3GPP), TS 23.008 V11.2.0, "Technical Specification Group Core Network and Terminals, Organization of Subscriber Data (Release 11)", Dec. 2011, pp. 1-105.

3rd Generation Partnership Project (3GPP), TS 23.040 V11.0.0, "Technical Specification Group Core Network and Terminals, Technical Realization of the Short Message Service (SMS) (Release 11 )", Dec. 2011, pp. 1-202.

3rd Generation Partnership Project (3GPP), TS 23.204 V11.1.0, "Technical Specification Group Services and System Aspects, Support of Short Message Service (SMS) Over Generic 3GPP Internet Protocol (IP) Access, Stage 2 (Release 11 )", Sep. 2011, pp. 1-53.

3rd Generation Partnership Project (3GPP), TS 23.682 V0.2.0, "Technical Specification Group Services and System Aspects, Architecture Enhancements to Facilitate Communications with Packet Data Networks and Applications, (Release 11)", Feb. 2012, pp. 1-23.

3rd Generation Partnership Project (3GPP), TS 23.682 V11.0.0, "Technical Specification Group Services and System Aspects, Architecture Enhancements to Facilitate Communications with Packet Data Networks and Applications (Release 11 )", Mar. 2012, pp. 1-24.

3rd Generation Partnership Project (3GPP), TS 29.002 V11.2.0, "Technical Specification Group Core Network and Terminals, Mobile Application Part (MAP) Specification (Release 11 )", Mar. 2012, pp. 1-956.

Becker et al., "Transport of CoAP over SMS", draft-becker-core-sms-gprs-05, The Internet Engineering Task Force (IETF), Aug. 8, 2014, pp. 1-14.

3rd Generation Partnership Project (3GPP), TR 21.905 V11.0.1, "Technical Specification Group Services and System Aspects, Vocabulary for 3GPP Specifications (Release 11)", Dec. 2011, 65 pages.

3rd Generation Partnership Project (3GPP), TR 23.039 V5.0.0, "Technical Specification Group Terminals, Interface Protocols for the Connection of Short Message Service Centres (SMSCs) to Short Message Entities (SMEs) (Release 5)", Jun. 2002, 7 pages.

3rd Generation Partnership Project (3GPP), TS 23.038 V10.0.0, "Technical Specification Group Core Network and Terminals, Alphabets and Language-Specific Information (Release 10)", Mar. 2011, 56 pages.

3rd Generation Partnership Project (3GPP), TS 24.007 V10.0.0, "Technical Specification Group Core Network and Terminals, Mobile Radio Interface Signalling Layer 3, General Aspects (Release 10)", Mar. 2011, 149 pages.

3rd Generation Partnership Project (3GPP), TS 24.011 V10.0.0, "Technical Specification Group Core Network and Terminals, Point-to-Point (PP) Short Message Service (SMS) Support on Mobile Radio Interface (Release 10)", Feb. 2011, 108 pages.

3rd Generation Partnership Project (3GPP), TS 29.272 V11.2.0, "Technical Specification Group Core Network and Terminals, Evolved Packet System (EPS), Mobility Management Entity (MME) and Serving GPRS Support Node (SGSN) Related Interfaces Based on Diameter Protocol (Release 11)", Mar. 2012, 98 pages.

(56) References Cited

OTHER PUBLICATIONS

Third Generation Partnership Project, "Technical Specification Group Core Network and Terminals; Tsp interface protocol between the MTC Interworking Function (MTC-IWF) and Service Capability Server (SCS) (Release 11)," 3GPP TS 29.368 V11.2.0 (Mar. 2013).
Third Generation Partnership Project, "Technical Specification Group Core Network and Terminals; Diameter-based T4 interface for communications with packet data networks and applications (Release 11)," 3GPP TS 29.337 V11.2.0 (Mar. 2013).
Third Generation Partnership Project, "Technical Specification Group Core Network and Terminals; Evolved Packet System (EPS); Mobility Management Entity (MME) and Serving GPRS Support Node (SGSN) related interfaces based on Diameter protocol (Release 12)," 3GPP TS 29.272 V12.0.0 (Mar. 2013).
Third Generation Partnership Project, "Technical Specification Group Core Network and Terminals; Evolved Packet System (EPS); Mobility Management Entity (MME) and Serving GPRS Support Node (SGSN) related interfaces based on Diameter protocol (Release 11)," 3GPP TS 29.272 V11.6.0 (Mar. 2013).
Third Generation Partnership Project, "Technical Specification Group Core Network and Terminals; Mobile Application Part (MAP) specification (Release 12)," 3GPP TS 29.002 V12.0.0 (Mar. 2013).
Third Generation Partnership Project, "Technical Specification Group Core Network and Terminals; Mobile Application Part (MAP) specification (Release 11)," 3GPP TS 29.002 V11.6.0 (Mar. 2013).
Third Generation Partnership Project, "Technical Specification Group Services and System Aspects; Vocabulary for 3GPP Specifications (Release 11)," 3GPP TR 21.905 V11.3.0 (Dec. 2012).
Third Generation Partnership Project, "Technical Specification Group Core Network and Terminals; Alphabets and language-specific information (Release 11)," 3GPP TS 23.038 V11.0.0 (Sep. 2012).
Third Generation Partnership Project, "Technical Specification Group Services and System Aspects; System improvements for Machine-Type Communications (MTC) (Release 11)," 3GPP TR 23.888 V11.0.0 (Sep. 2012).
Third Generation Partnership Project, "Technical Specification Group Core Network and Terminals; Organization of subscriber data (Release 11)," 3GPP TS 23.008 V11.3.0 (Mar. 2012).
Third Generation Partnership Project, "Technical Specification Group Core Network and Terminals; Organization of subscriber data (Release 11)," 3GPP TS 23.008 V11.7.0 (Mar. 2013).
Third Generation Partnership Project, "Technical Specification Group Core Network and Terminals; Technical realization of the Short Message Service (SMS) (Release 11)," 3GPP TS 23.040 V11.5.0 (Mar. 2013).
Third Generation Partnership Project, "Technical Specification Group Core Network and Terminals; Technical realization of the Short Message Service (SMS) (Release 11)," 3GPP TS 23.040 V11.1.0 (Mar. 2012).
Third Generation Partnership Project, "Technical Specification Group Services and System Aspects; Support of Short Message Service (SMS) over generic 3GPP Internet Protocol (IP) access; Stage 2 (Release 11)," 3GPP TS 23.204 V11.3.0 (Dec. 2012).
Third Generation Partnership Project, "Technical Specification Group Services and System Aspects; Architecture enhancements to facilitate communications with packet data networks and applications (Release 11)," 3GPP TS 23.682 V11.3.0 (Dec. 2012).
Third Generation Partnership Project, "Technical Specification Group Core Network and Terminals; Mobile radio interface signalling layer 3; General aspects (Release 11)," 3GPP TS 24.007 V11.0.0 (Jun. 2012).
Third Generation Partnership Project, "Technical Specification Group Core Network and Terminals; Point-to-Point (PP) Short Message Service (SMS) support on mobile radio interface (Release 11)," 3GPP TS 24.011 V11.1.0 (Sep. 2012).
Third Generation Partnership Project, "Technical Specification Group Services and System Aspects; Service requirements for Machine-Type Communications (MTC); Stage 1 (Release 11)," 3GPP TS 22.368 V11.4.0 (Mar. 2012).
Third Generation Partnership Project, "Technical Specification Group Services and System Aspects; Service requirements for Machine-Type Communications (MTC); Stage 1 (Release 11)," 3GPP TS 22368 V11.6.0 (Sep. 2012).
Third Generation Partnership Project, "Technical Specification Group Services and System Aspects; Service requirements for Machine-Type Communications (MTC); Stage 1 (Release 12)," 3GPP TS 22368 V12.2.0 (Mar. 2013).

* cited by examiner

SERVICE CAPABILITY SERVER (SCS) TERMINATED SHORT MESSAGE SERVICE (SMS) SYSTEMS AND METHODS

CROSS REFERENCE TO RELATED APPLICATIONS

This application is a continuation application of U.S. Non-provisional application Ser. No. 13/891,634, filed May 10, 2013, which issued as U.S. Pat. No. 9,503,869 on Nov. 22, 2016, which claims the benefit of U.S. Provisional Patent Application No. 61/645,834 filed on May 11, 2012, the contents of which are hereby incorporated by reference herein.

BACKGROUND

Machine type communications (MTC) may enable machines to communicate with each other or with humans. For example, one or more low cost MTC devices may communicate with MTC servers over mobile networks using a 3rd Generation Partnership Project (3GPP) network. Transport and/or communication services for MTC devices and/or MTC servers for end-to-end applications may be provided by the 3GPP network. Examples of the MTC services may include smart metering, home automation, eHealth, consumer products, fleet management, etc.

The MTC devices, using the 3GPP services, may send small but recurring data to the MTC servers. The mechanisms used in mobile networks (e.g., 3GPP-based networks) to handle such small data transmission may be less optimal for machine-to-machine or machine-to-human applications.

SUMMARY

Systems, methods, and instrumentalities are provided to determine routing associated with a short message (e.g., an SMS message). An SMS-SC may send a first routing request to a home subscriber server (HSS). The first routing request may be associated with the short message. The first routing request may include an MTC indicator field. The first request may be forwarded over a MAP-C interface. The SMS-SC may receive a first routing reply. The first routing reply may include one of an indication that the short message may be associated with a service capability server (SCS) or a first control plane routing associated with the short message. The SMS-SC may send the short message to an SCS serving node (e.g., based on the first control plane routing or based on information received from an SCS subscription database). The SMS-SC may receive a delivery report. The delivery report may indicate delivery of the short message (e.g., to one or more of the SCS serving node or the SCS).

The first routing reply may include the first control plane routing. The first control plane routing may include an SCS serving node. The first control plane routing may further include an SCS serving node address (e.g., a MTC-IWF address).

The first routing reply may include the indication that the short message is associated with a service capability server (SCS). The SMS-SC may send a second routing request to a SCS subscription database. The SMS-SC may receive a second routing reply from the SCS subscription database. The second routing reply may include a primary machine type communication inter-working function (MTC-IWF) field, a gateway address field, a preferred application protocol field, and/or a short message container field. The second routing reply may indicate a second control plane routing for the short message. The second control plane routing may include identification of the SCS serving node. The SCS serving node may be a machine type communication inter-working function (MTC-IWF) node.

BRIEF DESCRIPTION OF THE DRAWINGS

A more detailed understanding may be had from the following description, given by way of example in conjunction with the accompanying drawings.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate message sequence charts, which are meant to be exemplary. Other embodiments may be used. The order of the messages may be varied where appropriate. Messages may be omitted if not needed, and, additional flows may be added.

Figure 1A:
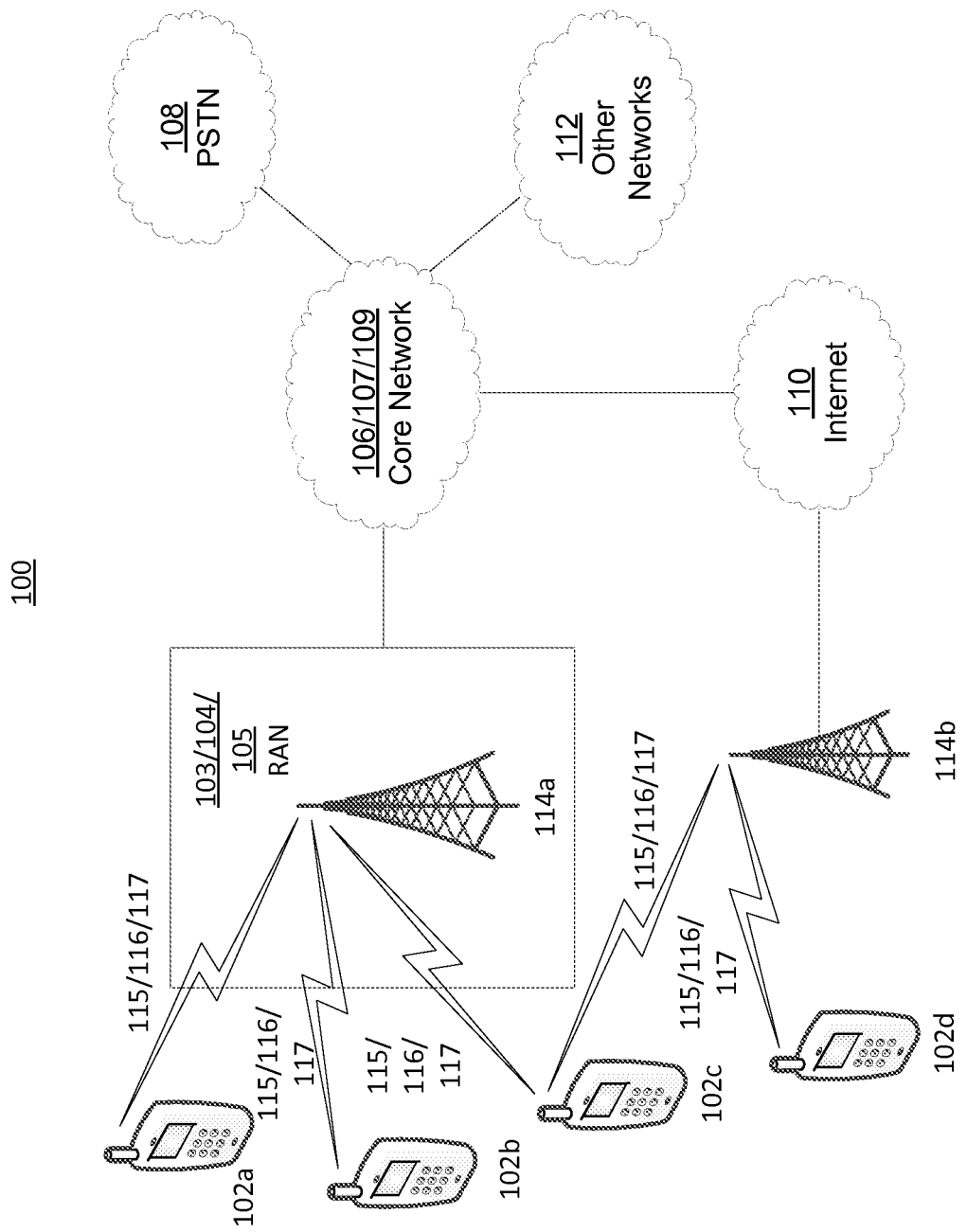
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/ 105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b. 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
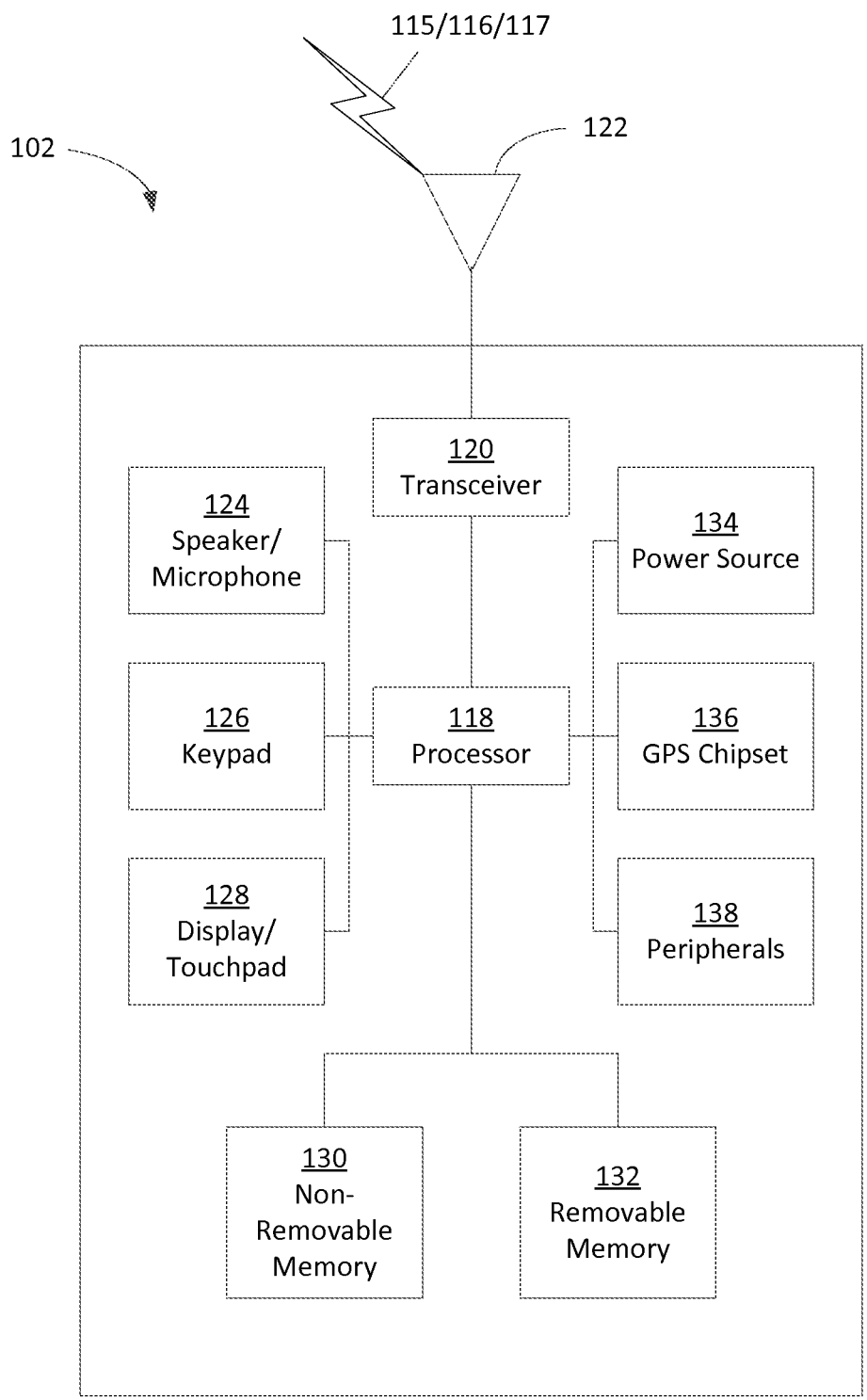
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
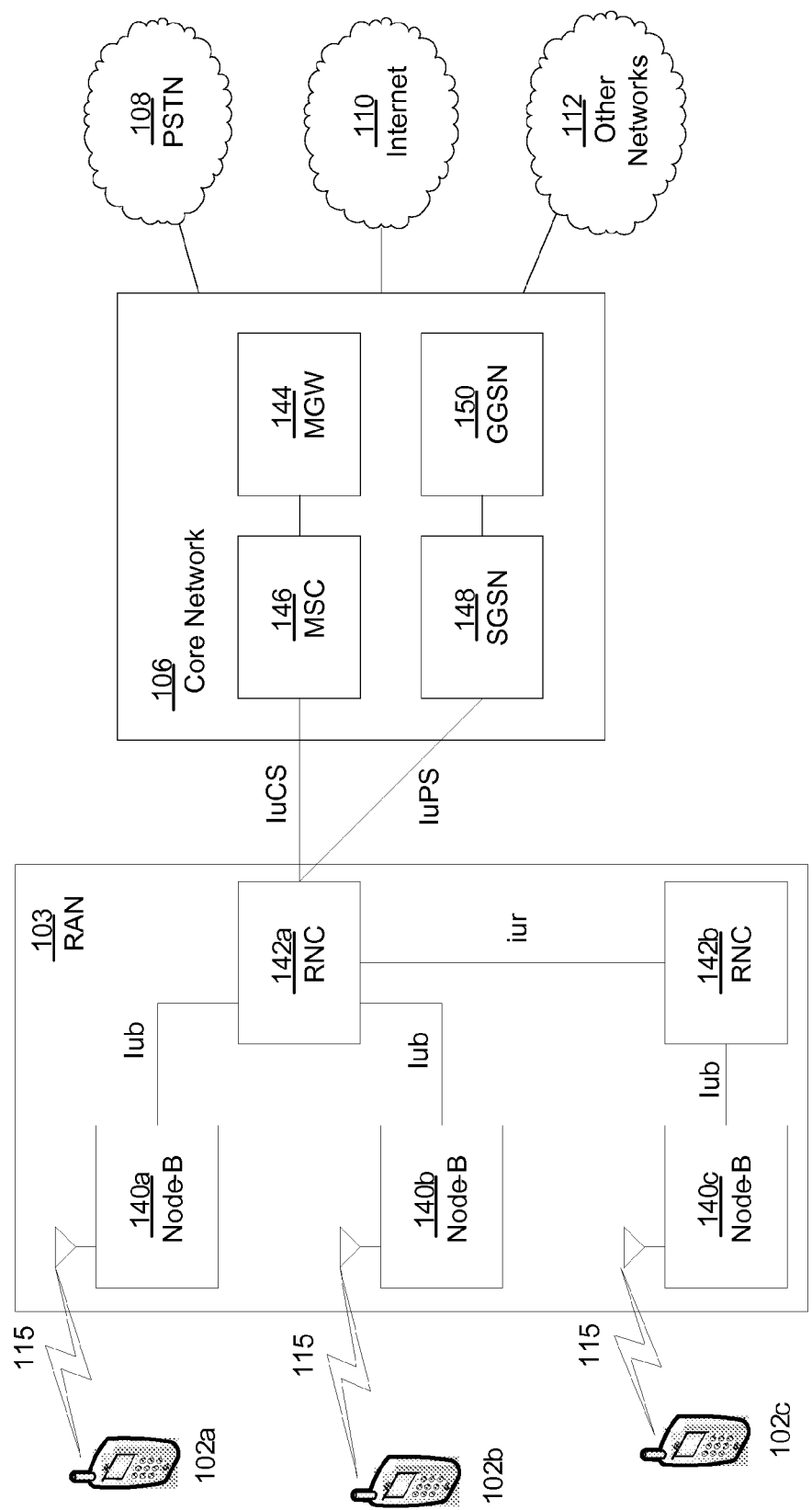
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
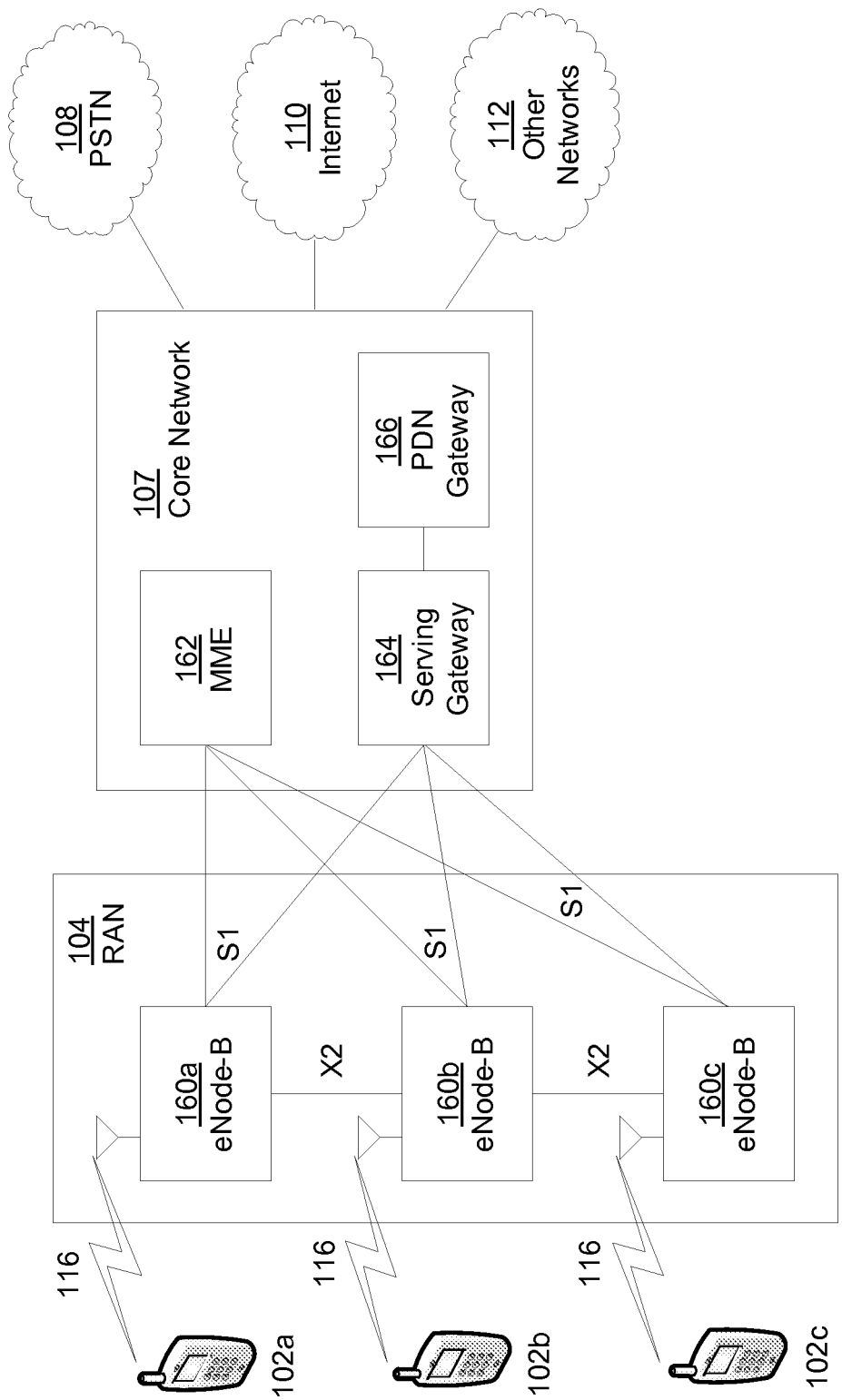
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b. 102c with access to the networks 112, which may include other wired or wireless networks that are owned and/or operated by other service providers.

Figure 1E:
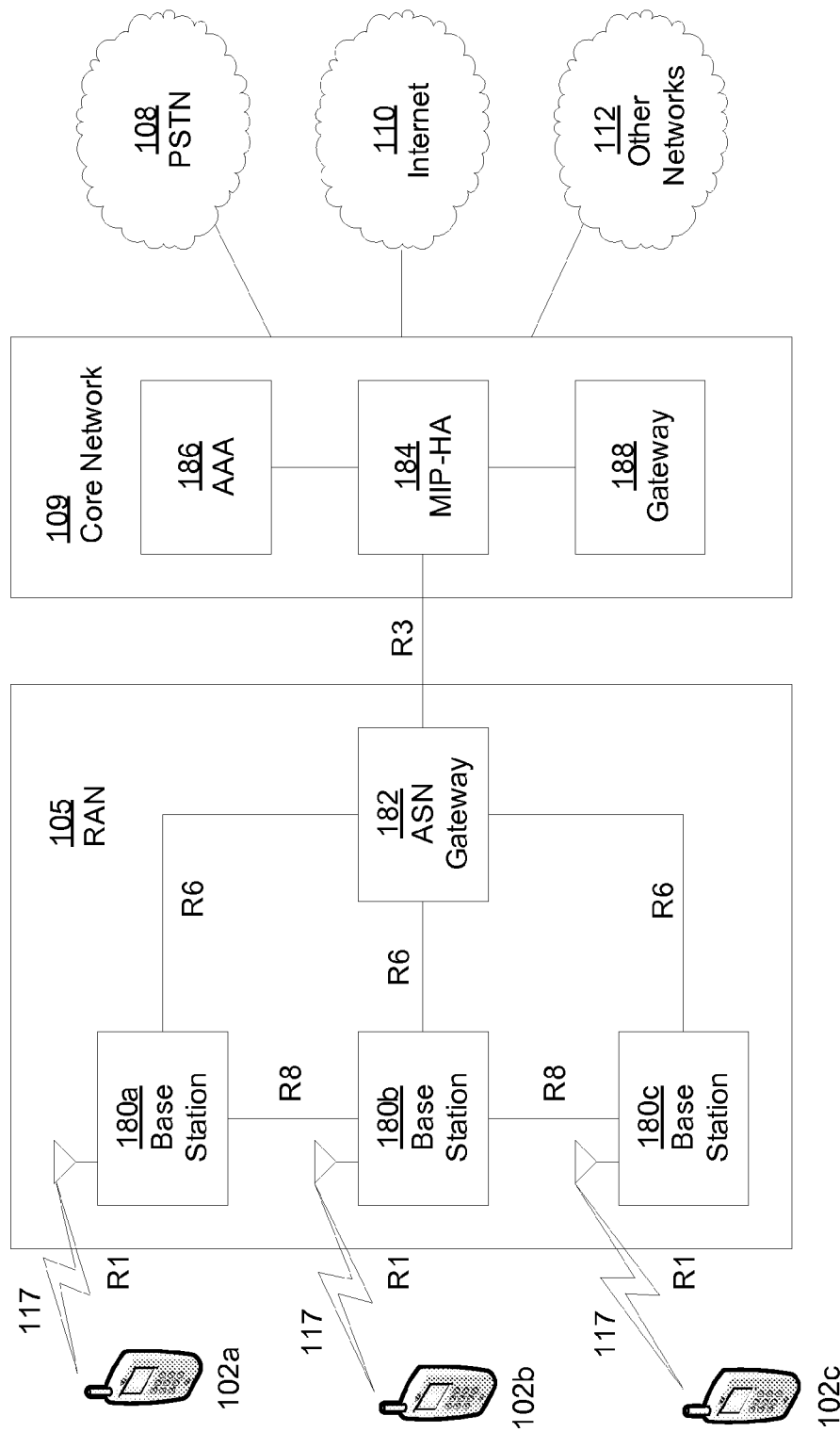
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a. 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b. 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a. 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b. 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
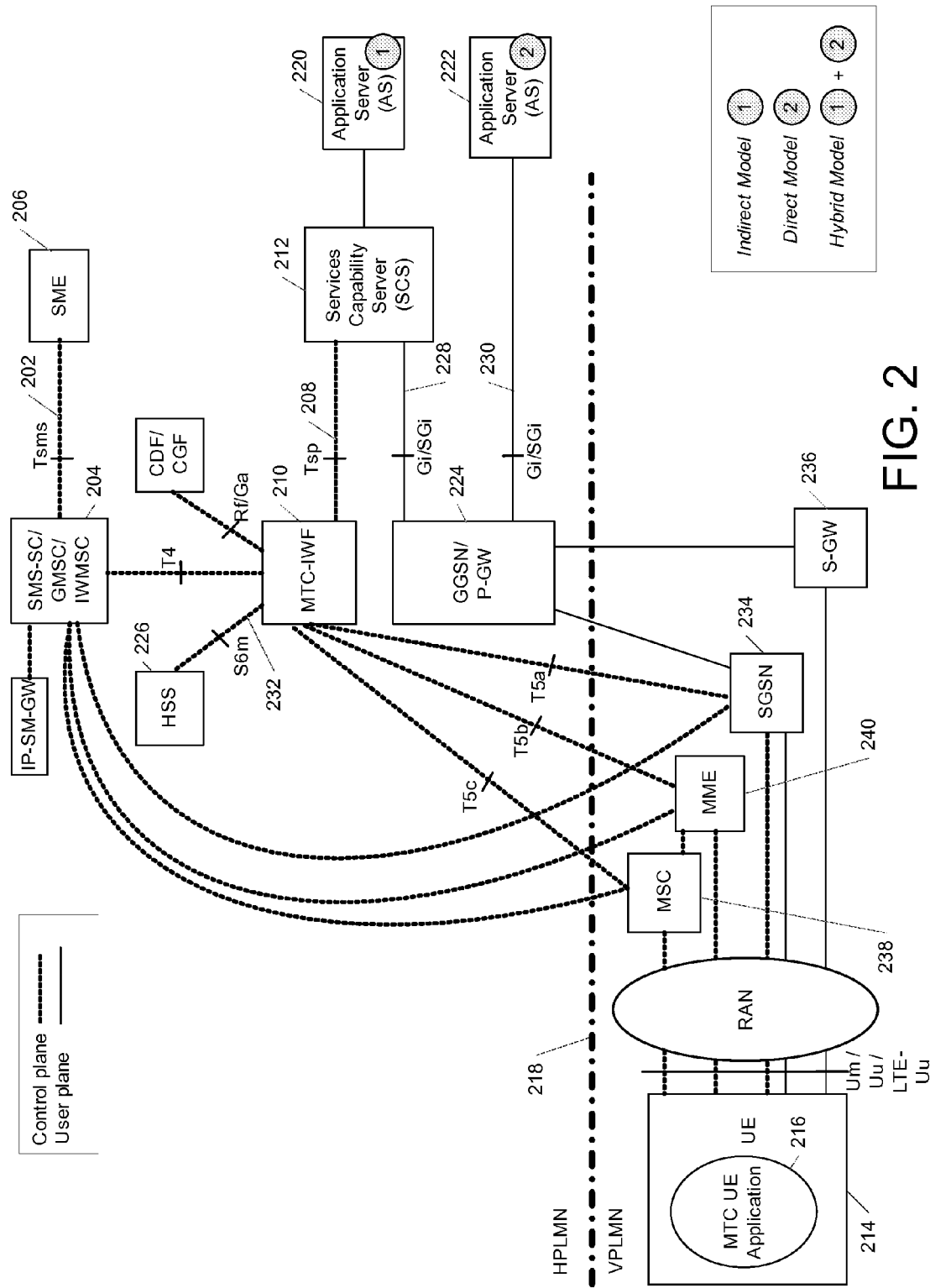
FIG. 2 illustrates exemplary 3GPP machine type communication (MTC) architecture.
Figure 3:
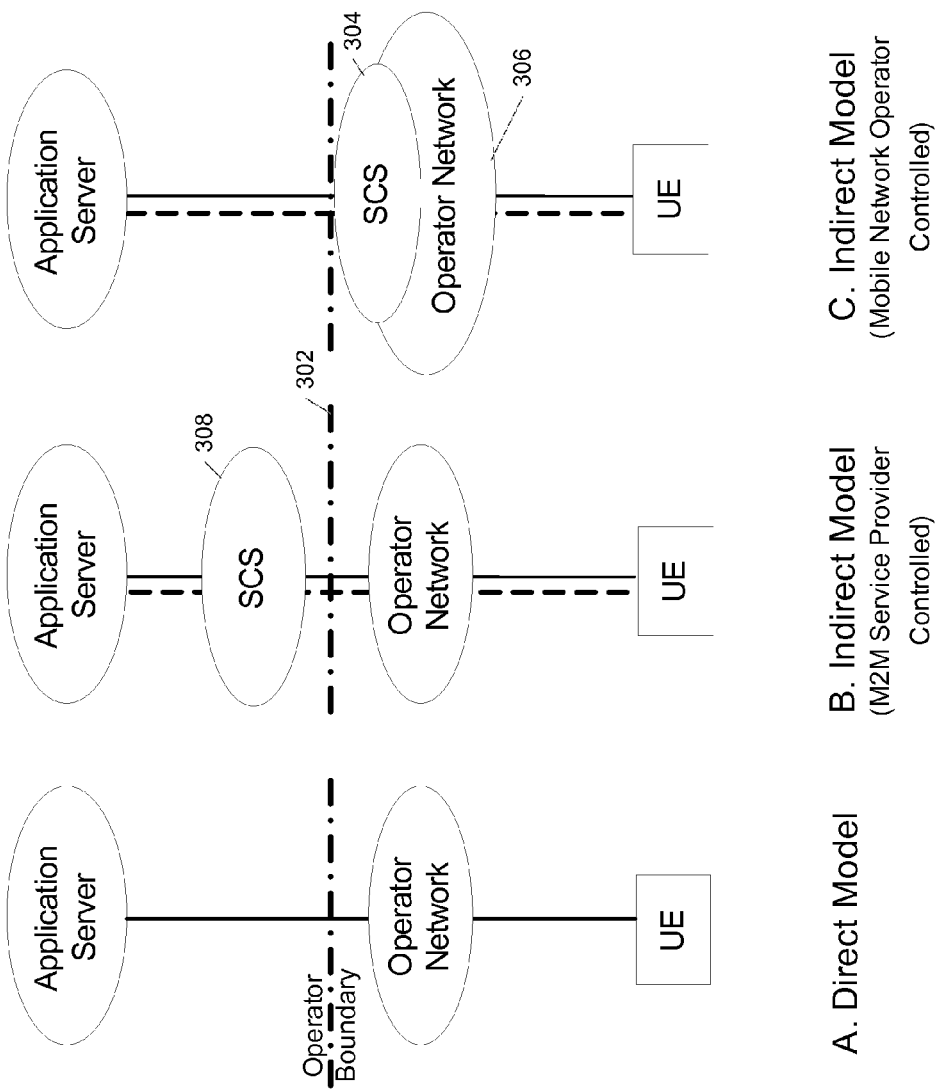
FIG. 3 illustrates exemplary deployment scenarios of service capability server (SCS).

FIG. 2 illustrates exemplary 3GPP architecture for machine type communication (MTC). As illustrated in FIG. 2, the reference point Tsms 202 may connect a short message service (SMS) service center (SMS-SC) 204 to a short message entity (SME) 206. The reference point Tsp 208 may connect a machine type communication (MTC) inter working function (MTC-IWF) node 210 to a service capability server (SCS) 212. An SCS 212 may be controlled by the operator of the home public land mobile network (HPLMN) or by an MTC service provider. An SCS may be deployed inside or outside the operator domain, as illustrated in FIG. 3. FIG. 3 illustrates various exemplary scenarios of SCS deployment. As illustrated in FIG. 3, if an SCS 304 is deployed inside the operator domain (e.g., within boundary 302 or an operator's network 306), the SCS 304 may be an internal network function and may be controlled by the operator. If an SCS 308 is deployed outside the operator domain (e.g., outside the operator boundary 302), the SCS may be controlled by a MTC service provider. In this case, security and privacy protection for communication between the MTC-IWF and SCS may be needed.

As illustrated in FIG. 2, the SCS 212 may be an entity that may connect to a 3GPP network to communicate with user equipment MTC (UE MTC) application 216. The MTC-IWF 210 in the HPLMN (e.g., as defined by the boundary 218) or a SMS-SC 204 for device triggering. The SCS 212 may offer capabilities for use by one or more application server MTC (AS MTC) applications.

An MTC UE 214 may host one or more MTC applications 216. The MTC applications may be hosted on one or more ASs 220/222. A UE may communicate through a public land mobile network (PLMN) with SCS(s) and/or other MTC UE(s). An MTC UE 214 may host one or more MTC applications 216. An MTC UE 214 may be a device that may use a cellular gateway to access the PLMN. The UE application 216 may be a MTC communication endpoint that may interact with SCSs 212, AS MTC applications, or other UE MTC applications.

An application server (AS) 220/222 may host one or more MTC applications. An AS may interface with SCS(s) 212 or a GGSN/P-GW 224. The MTC applications may interact with SCSs, UE MTC applications, or other MTC applications.

The MTC inter working function (MTC-IWF) 210 may hide the internal PLMN topology, from the SCS 212. The MTC-IWF may relay and/or translate signaling protocols used between itself and the SCS (e.g., over the Tsp reference point 208) to support MTC functionality (e.g., MTC UE triggering) in the PLMN. For example, an MTC trigger may be delivered to an MTC device 214 via SMS. The MTC device 216, based on the trigger, may respond to a SCS 212. The MTC device 216 may, for example, respond with a sensor reading. When the MTC device 216 responds to the SCS 212, the MTC device may establish a packet data network (PDN)/packet data protocol (PDP) connection with the SCS 212. The MTC device may connect with the SCS using an IP connection. If the MTC device responds with a small amount of data, it may be efficient to send the data to the SCS via a short message (e.g., a SMS). Using the short message, the system may support transmissions of small amounts of data with minimal network impact (e.g., signaling overhead, allocation of radio and/or other network resources, delay for reallocation, etc.).

The MTC-IWF 210 may authorize an SCS 212, before the SCS may establish communication with a 3GPP network. For example, when the SCS 212 makes a trigger request on the Tsp reference point, the MTC-IWF 210 may check whether the SCS is authorized to send the trigger request and that the SCS has not exceeded its quota or rate of trigger submissions. A trigger quota may be assigned on a per MTC UE basis and/or a SCS basis. The quota may be used for charging and authorization on a UE basis.

The core network may maintain subscription information for SCSs and new information may be added to the home subscriber server (HSS) 226 for MTC UEs. The SCS subscription database may be maintained in the core network and may be used for authorizing SCS connections on the Tsp reference point 208 and to locate the SCS serving node so that control and data may be routed towards the SCS.

The SCS subscription database may be used in the SCS authorization and trigger authorization procedures. Table 2 illustrates an exemplary list of fields for MTC UE subscriber information. The fields may be used to authorize requests to send small data to/from the MTC UE and/or to authorize requests to trigger the MTC UE.

An SCS Subscription database may be maintained in the 3GPP core network. The database may have an entry for each SCS that may subscribe to the core network. The SCS subscription database may be a standalone logical entity or may be a part of another core network entity such as the HSS 226 or MTC-IWF 210. Table 1 illustrates exemplary fields of a SCS database entry.

TABLE 1

| Field Name |
| --- |
| SCS Subscription ID |
| SCS Public ID(s) |
| Serving Node |
| SMS Capable |
| SCS Trigger Quota |
| Primary MTC-IWF |
| Gateway Address |
| Preferred Application Protocol |
| Short Message Container Name |

Permanent subscriber data may be changed by administration means. Temporary subscriber data may change as a result of normal operation of the system. The SCS subscription identifier may be permanent subscriber data and may be used for the following purposes: authentication on the Tsp reference point, charging on the Tsp reference point, charging for SMS messages that may be sent towards the SCS, or charging for the data that may be sent to the SMS-SC 204, e.g., via Gi interface 228. The MTC-IWF 210 may create charging data records (CDRs) for triggers that may be generated by the SCS 212. The MTC-IWF 210 may perform online charging to monitor to number of triggers that may be generated by the SCS 212 in a time period. The SMS-SC 204 may perform online and offline charging for the SMS messages that may be sent towards the SCS. The GGSN/P-GW may perform online and offline charging for the PDP/PDN connections that may be established towards the SCS.

The format of the SCS subscription ID may be an international mobile subscriber identity (IMSI). Temporary subscription identifiers may be established for security purposes, in a manner similar to establishing a temporary international mobile subscriber identity (T-IMSI) for a 3GPP UE.

SCS public identifiers may be permanent subscriber data and may be used for the following purposes: identification on the Tsp reference point 208, charging on the Tsp reference point (e.g., instead of the SCS Subscription ID), charging for SMS messages that may be sent towards the SCS (e.g., instead of the SCS subscription ID), or charging for data that may be sent to the SMS-SC via the Gi interface (e.g., instead of the SCS subscription ID). The MTC devices may use the SCS public identifier to send SMS messages and/or IP packets towards the SCS.

The format of the SCS public ID may be the format of a fully qualified domain name (FQDN), a MSISDN, an internet protocol (IP) address, or an alpha-numeric format. The SCS may have multiple public identifiers. The SCS public ID may be used as a field in trigger message interactions on the Tsp reference point. The SCS public identifier may be an MSISDN. A special range of MSISDNs may be allocated for SCSs so that core network node may identify when traffic is destined for a UE or an SCS.

The SCS serving node identifier may be temporary subscriber data that may be used for the following purposes. The SCS serving node identifier may belong to a SCS serving node. The SCS serving node may be a core network node. An SCS may be connected to the SCS serving node for control plane communications (e.g., including short message exchange). Other core network nodes may use this information to determine the next hop destination of the control messages in order to reach a particular SCS. The SCS serving node may be an MTC-IWF, an MSC, an MME, an SGSN, or an S-GW. An SCS may be connected to one or more MTC-IWFs. The serving node may be the primary node that may be used for routing control information towards a SCS. The SCS serving node identifier may be an IP address, an SS7 address, or an ISDN address.

The SMS capable flag may be permanent subscriber data and may be used to indicate if the SCS is capable of receiving SMS messages. If the SCS is capable of receiving SMS messages, the core network may forward SMS messages to the SCS without encapsulating or converting them to another protocol.

The SCS trigger quota may be permanent subscriber data and may indicate the number of triggers that a SCS is allowed to request per time period. The SCS trigger quota may define the number of successful triggers that a SCS may initiate in a per unit of time. The primary MTC-IWF may be the MTC-IWF that may be used for routing control and/or data messages towards the SCS.

The gateway address in the subscription database may be PDN gateway address or the GGSN address in use of the SCS. The gateway address may be used to determine the gateway that may be used to send data to the SCS. e.g., via the Gi or SGi reference point 228.

A preferred application protocol field may indicate the application protocol that may be used when communicating with the SCS over the Tsp or Gi/SGi reference points. The application protocols may for example include hypertext transfer protocol (HTTP), constrained application protocol (CoAP), etc. When restful protocols such as HTTP or CoAP are used to transfer SMS messages over the Tsp, the Short Message Container Name field may be used to identify the name of the resource that may be used to PUT the short message.

MTC UE subscriber information may include additional fields. The additional fields may be added to the subscriber database in the HSS to support MTC UEs. Table 2 illustrates exemplary fields associated with subscriber information of MTC UEs

TABLE 2

| Field Name |
| --- |
| External Identifiers |
| Permitted for Triggering |
| Permitted for Small Data |
| Permitted Destinations for Small Data |
| Device Trigger Quota |
| Device Trigger Quota per SCS |
| Preferred Trigger Delivery Method |
| Supported Trigger Delivery Methods |

As illustrated in table 2, the External Identifiers field may provide the subscription information of MTC devices. The External Identifier list may be a list of FQDNs or mobile subscriber ISDN identities (MSISDNs).

The MTC-IWF may authorize trigger requests from the SCS. A non-SCS device (e.g., an SME) may send unauthorized triggers towards an MTC device. The SMS-SC may authorize triggers sent towards MTC UEs to check if the sender is permitted to send triggers to the device. A Permitted for Triggering field may be added to the subscription information of MTC devices so that the MTC-IWF and/or the SMS-SC may check which SCSs may be allowed to trigger the MTC devices. The Permitted for Triggering field may be a list of SCS or SME identifiers. The format of each identifier may be that of an MSISDN, an FQDN, an IMSI, or an IP address.

An SME may send garbage SMS messages towards an MTC UE. The energy wasted by the MTC UE when receiving the unwanted SMS messages may cause its battery to drain more quickly. The SMS-SC may authorize small data messages sent towards MTC UEs to check if the sender (e.g., an SCS) is permitted to send small data to the device. A Permitted for Small Data field may be added to the subscription information of MTC devices so that the MTC-IWF and SMS-SC may check which SCSs may be allowed to send small data to the MTC UE. The Permitted for Small Data field may be a list of SCS or SME identifiers. The format of each identifier may be that of an MSISDN, an FQDN, an IMSI, or an IP address.

A Permitted Destinations for Small Data field may be added to the subscription information of MTC devices so that the MTC-IWF and SMS-SC may check to which SCSs and UEs, the MTC UE may be allowed to send small data. The Permitted for Small Data field may be a list of SCS or short messaging entity (SME) identifiers. The format of each identifier may be that of an MSISDN, an FQDN, an IMSI, or an IP address.

A trigger quota may be established per MTC device. The Device Trigger Quota field may be added to the subscription information of MTC devices. The SMS-SC or MTC-IWF may check if the device has received more than its allotted number of triggers. The MTC-IWF may be required to check that the SCS has not requested more than its allotted number of triggers. This field may be defined for an MTC device subscription (or an MTC Group subscription). The field may be used to apply an online charging mechanism.

A trigger quota may be established per MTC device per SCS. The Device Trigger Quota per SCS field may be added to the subscription information of MTC devices so that the MTC-IWF may check if the device has received more than its allotted number of triggers from a particular SCS. The MTC-IWF may check that the SCS has not requested more than its allotted number of triggers. This field may be defined for an MTC device subscription or an MTC Group subscription. Device Trigger Quota per SCS field may allow the use of an online charging mechanism.

A Preferred Trigger Delivery Method field may be added to the subscription information of MTC devices so that the MTC-IWF may check which method the device may prefer to use for receiving triggers (e.g., SMS signaling, SMS over IMS signaling, non-access stratum (NAS) signaling, etc.). The MTC-IWF may select a trigger delivery method.

A Supported Trigger Delivery Methods field may be added to the subscription information of MTC devices so that the MTC-IWF may check which methods the MTC devices may support for receiving triggers (e.g., SMS Signaling, SMS over IMS signaling, NAS signaling, etc.). The MTC-IWF may select a trigger delivery method.

Each of the MTC-IWF nodes may be assigned an ISDN address, an IP address, an SS7 address, or some other identifier so that the MTC-IWF node may be addressed by other network nodes (e.g., SMS-SC, HSS, etc.).

Figure 4:
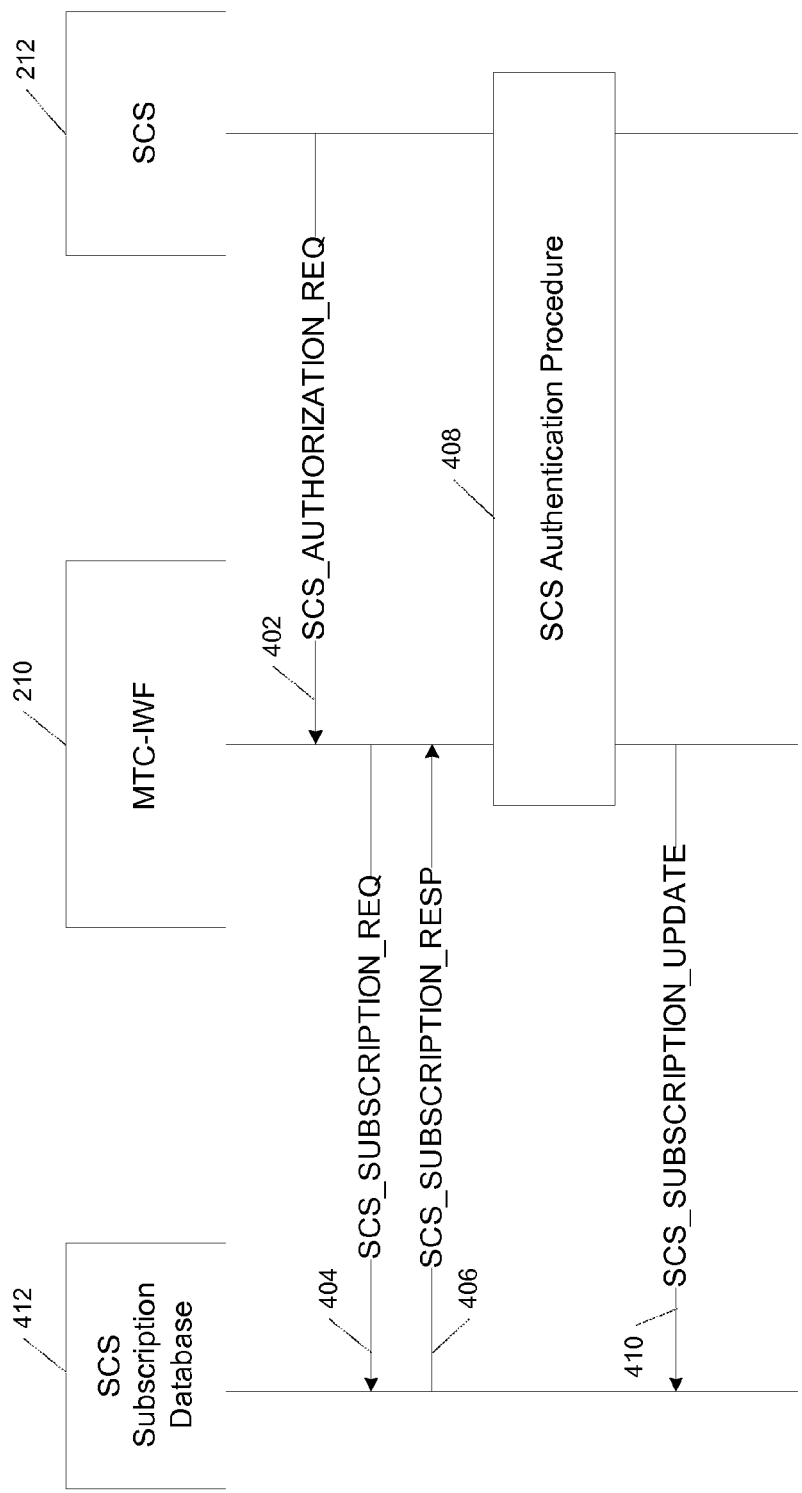
FIG. 4 illustrates exemplary message sequence chart for SCS authorization.

FIG. 4 illustrates an exemplary message sequence chart of SCS authorization. As illustrated in FIG. 4, when an SCS attempts to establish a connection with an MTC-IWF, the SCS may be authorized by the MTC-IWF. The SCS subscription database may be a standalone entity, a part of the MTC-IWF, part of the HSS, or part of a core network entity. At 402, the SCS 212 may send an authorization request (e.g., an SCS Public ID) to the MTC-IWF 210, e.g., via the Tsp reference point. At 404, the MTC-IWF 210 may request the SCS subscription information from the SCS subscription database (e.g., SCS Public ID). If the SCS subscription database is part of the HSS, the request may be made, e.g., via the S6m reference point 232, as illustrated in FIG. 2. At 406, the SCS subscription database may respond with the SCS subscription information (e.g., SCS subscription ID and security keys). If the SCS subscription database is part of the HSS, the request may be made via the S6m reference point 232, as illustrated in FIG. 2. At 408, the MTC-IWF 210 and SCS 212 may execute an authentication procedure over the Tsp reference point. The security keys used in SCS authorization at 402-406 may be used for SCS authentication procedure at 408. At 410, the MTC-IWF may inform the SCS subscription database that the SCS has been authorized and is now connected to the MTC-IWF. The SCS subscription database may update the serving node field of the SCS's subscription information, e.g., via the S6m reference point.

Figure 5:
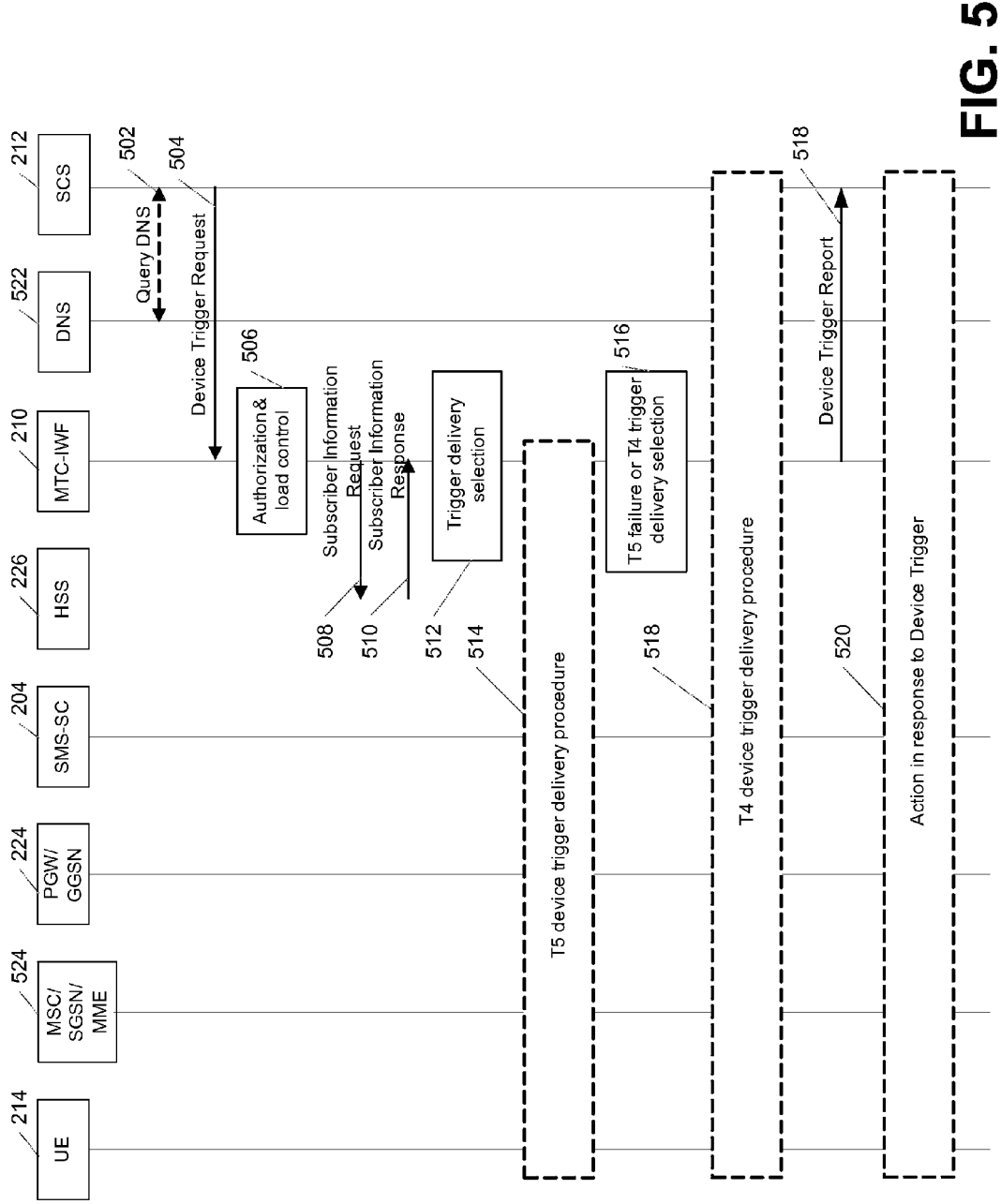
FIG. 5 illustrates exemplary message sequence chart for device triggering over the Tsp interface.

FIG. 5 illustrates an exemplary message sequence chart for device triggering over the Tsp reference point. At 506, the MTC-IWF 210 may check whether the SCS 212 is authorized to send trigger requests and if so, whether the SCS has exceeded its quota or rate of trigger submission over Tsp. At 508, the MTC-IWF 210 may send a request to the HSS 226 for the SCS subscriber information or MTC UE subscriber information. At 510, the MTC-IWF 210 may receive a response from the HSS 226. The SCS subscriber information or the MTC UE subscriber information may include the SCS trigger quota. If a quota that is associated with the SCS or the MTC UE has been met the MTC-IWF may send a trigger confirm message to the SCS. The trigger confirm message may indicate that trigger authorization has failed. The trigger confirm message may indicate which quota(s) have met and at what time the SCS may make another trigger attempt.

The MTC UE may send an SMS message to an SCS. The SMS message may be sent to an SMS-SC. The SMS-SC may forward it to the SCS. The SCS may be assigned an MSISDN.

Figure 6:
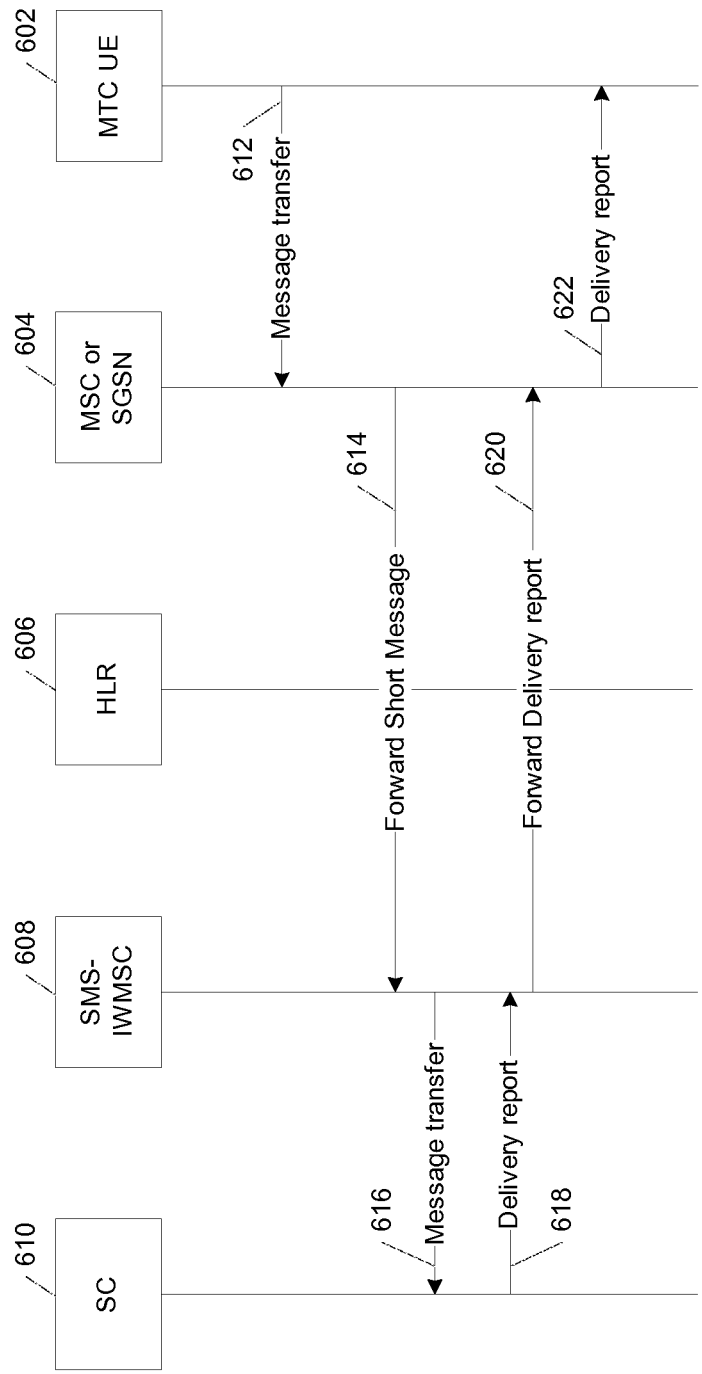
FIG. 6 illustrates exemplary message sequence chart for successful mobile originated (MO) short message transfer attempt.

FIG. 6 illustrates an exemplary message sequence diagram of a mobile originated (MO) short message transfer attempt that shows how an SMS may be transferred from an MTC UE 602 to its service center (SC) 610. At 612, a short message (e.g., an SMS message) may be sent to an MSC/SGSN 604. The MSC/SGSN may forward the short message to an SMS-SC 608. The SMS-SC after finding the routing information may transfer the short message to an SC 610. At 618, the SC 610 may send a delivery report to the SMS-SC 608. At 620, the SMS-SC may forward the delivery report to the serving node 604, which at 622 may forward the delivery report to the MTC UE.

Figure 7:
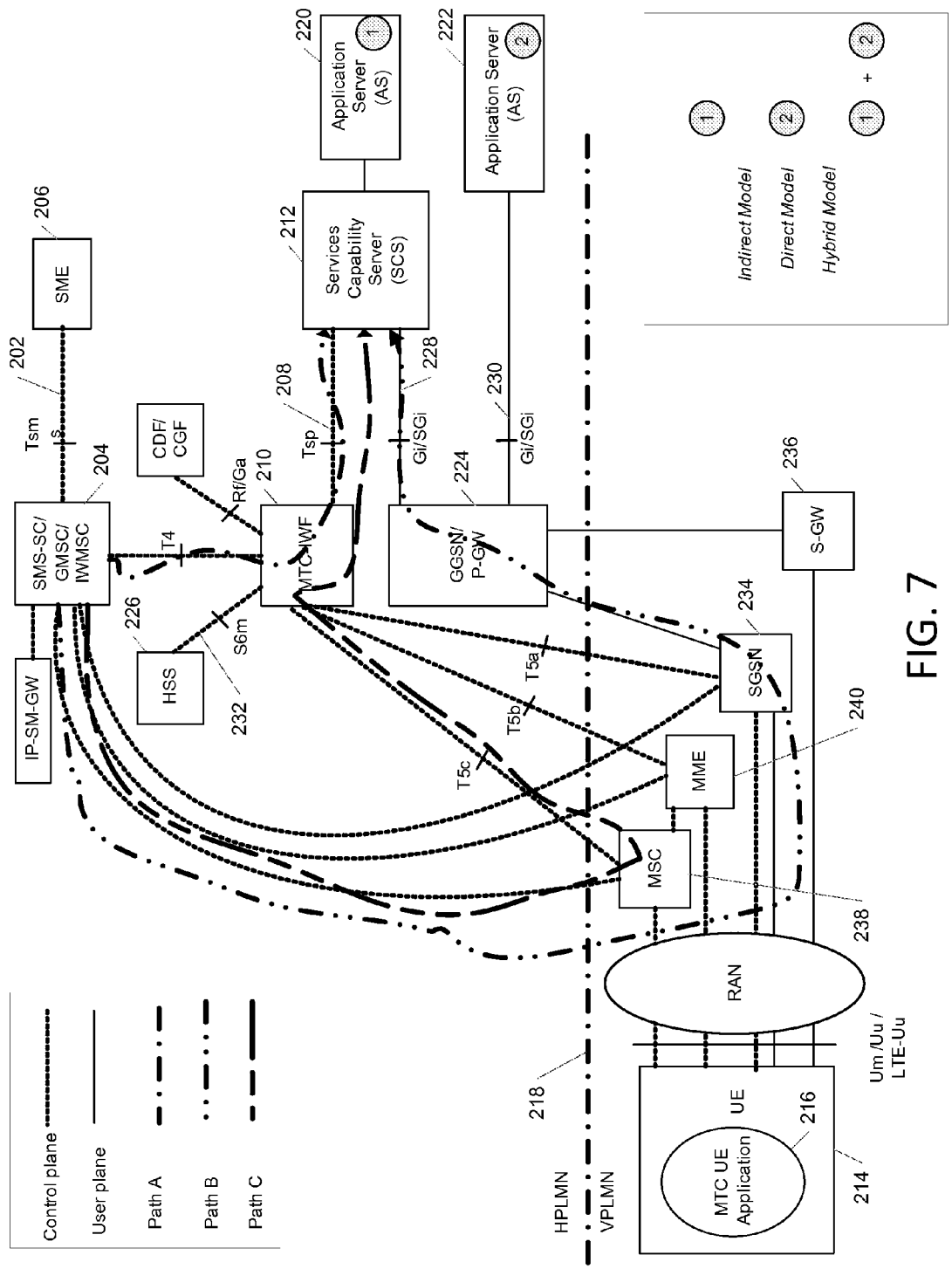
FIG. 7 illustrates an exemplary 3GPP MTC architecture illustrating delivering a short message from the SMS service center (SMS-SC) to a SCS.

FIG. 7 illustrates how a short message (e.g., an SMS message) may be sent from the SMS-SC to the SCS. As illustrated in FIG. 7, one path (e.g., path A) may be a path designated by a dotted and dashed line extending between the SMS-SC 204, the MTC-IWF 210, and the SCS 212. In this case, the SMS-SC 204 may send the short message to the MTC-IWF 210 and the MTC-IWF may forward the message to the SCS 212.

As illustrated in FIG. 7, in another path (e.g., path B), a short message (e.g., an SMS message) may be a path designated by a double dotted and dashed line extending between the SMS-SC 204, the SGSN 702, the GGSN/P-GW 224, and the SCS 212. In this case, the SMS-SC 204 may send the short message to the SGSN 234 or S-GW 236. The SGSN or S-GW may then connect to the SCS via the GGSN or P-GW 224, which may deliver the message to the SCS 212.

As illustrated in FIG. 7, in another path (e.g., path C) a short message (e.g., an SMS message) may be a path designated by a double short dashed and a long dashed line extending between the SMS-SC 204, the MSC 238, the MTC-IWF 210, and the SCS 212. In this case, the SMS-SC may send the short message to the MSC 238, MME 240, or SGSN 234. The MSC 238, MME 240, or SGSN 234 may forward the message to the MTC-IWF 210, which may forward the message to the SCS 212.

In one or more of the paths described herein, a core network node may convert or encapsulate the short message (e.g., an SMS message) into an application protocol. The encapsulated message may be sent over an IP connection. For example, the SMS message may be encapsulated in an HTTP message, or sent via constrained application protocol (CoAP). The SCS may have a dedicated resource, or container to receive the short messages.

When the short message follows a path (e.g., path A), the MTC-IWF may be the serving node of the SCS. The short messages and/or other control information may be routed from the SMS-SC 204 to the SCS 212 via the MTC-IWF 210.

Figure 8:
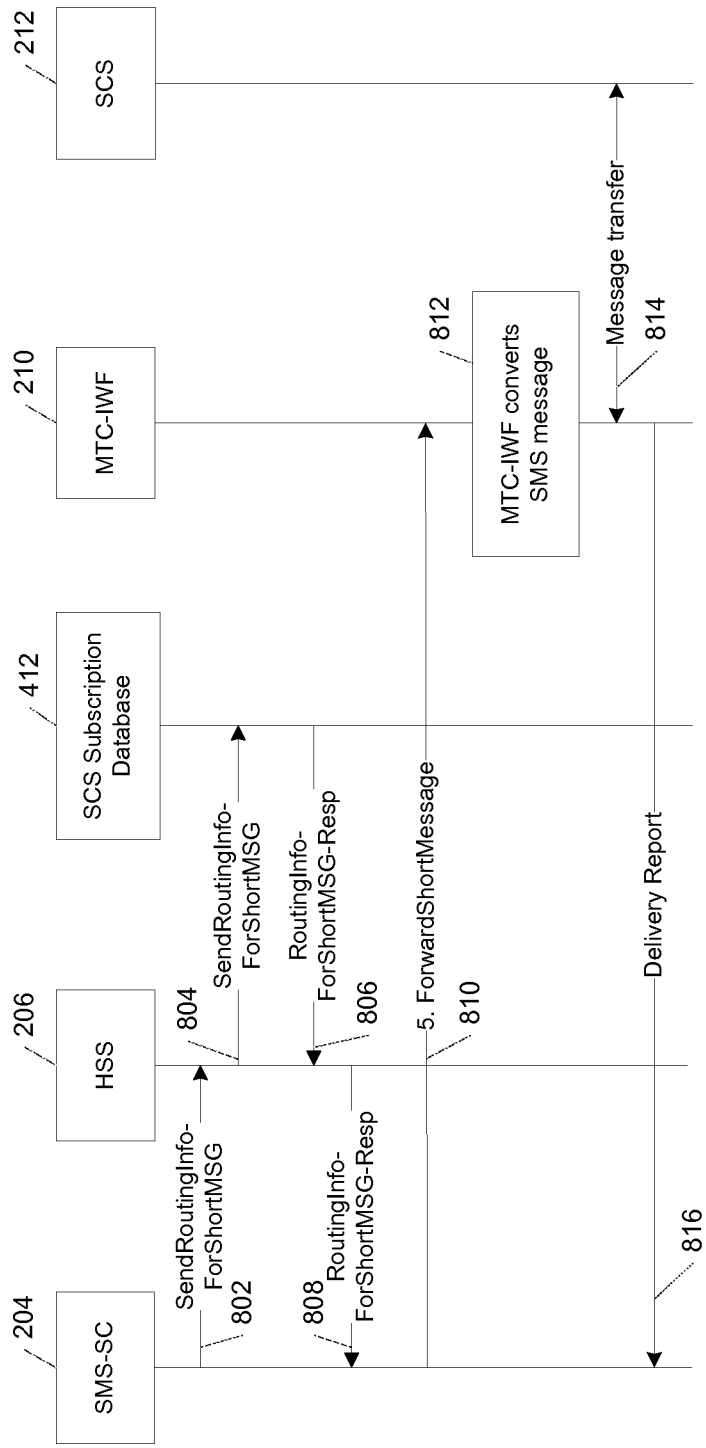
FIG. 8 illustrates an exemplary message sequence chart of a successful short message transfer attempt from a MTC inter working function (MTC-IWF) to SCS (path A).

FIG. 8 illustrates exemplary message sequence chart of a successful SCS terminated short message transfer attempt, when MTC-IWF 210 is used as a serving node. At 802, the SMS-SC 204 may query the HSS 206 for serving node of the SMS recipient. The SMS-SC may not know that the recipient is an SCS. The SMS-SC 204 may assume that the recipient is a UE. At 804, when the HSS 206 receives the routing request (e.g., SendRoutingInfoForShortMSG) from the SMS-SC 204, it may recognize that the recipient's MSISDN belongs to an SCS. The HSS 206 may forward the request to the SCS Subscription database 412. Table 3 illustrates exemplary MAP-SEND-ROUTING-INFO-FOR-SMS primitives. The SCS subscription database may support this service. When the SMS recipient is a UE, the HSS 206 may populate the Network Node Number field with the ISDN address of the MSC 238 and the GPRS Node Indicator field with the ISDN address of the SGSN that may serve the recipient. An MTC Node Indicator field may be added to the MAP-SEND-ROUTING-INFO-FOR-SMS primitive. The MTC Node Indicator field may be populated with the ISDN address (or other identifier such as SS7 address or IP address) of the MTC-IWF that may serve the SCS. This address may be retrieved from the SCS subscription database.

TABLE 3

| Parameter name | Request | Indication | Response | Confirm |
|---|---|---|---|---|
| Invoke Id | M | M(=) | M(=) | M(=) |
| MSISDN | M | M(=) | | |
| SM-RP-PRI | M | M(=) | | |
| Service Centre Address | M | M(=) | | |
| SM-RP-MTI | C | C(=) | | |
| SM-RP-SMEA | C | C(=) | | |
| GPRS Support Indicator | C | C(=) | | |
| SM-Delivery Not Intended | U | C(=) | | |
| IP-SM-GW Guidance Support Indicator | U | C(=) | | |
| IMSI | | | C | C(=) |
| Network Node Number | | | C | C(=) |
| LMSI | | | C | C(=) |
| GPRS Node Indicator | | | C | C(=) |
| Additional Number | | | C | C(=) |
| IP-SM-GW Guidance | | | U | C(=) |
| User error | | | C | C(=) |
| Provider error | | | | O |
| MTC Node Indicator | | | C | C(=) |

When the MSISDN belongs to an SCS, MTC Node Indicator field may be used instead of the Network Node Number and the GPRS Node Indicator fields. In other case, the Network Node Number or the GPRS Node Indicator fields may be populated with the ISDN (or other identifier such as SS7 address or IP address) of the MTC-IWF so that the SMS-SC may send the SMS to the MTC-IWF.

The HSS may respond with an indication that the recipient MSISDN belongs to an SCS and the SMS-SC may directly query the SCS subscription database. At 806, the SMS routing information (e.g., including MTC-IWF address) may be sent to the HSS 206. At 808, the SMS-SC 204 may receive the SMS routing information from the HSS 206. At 810, the SMS-SC 204 may route the short message to the MTC-IWF 210 (e.g., over the T4 reference point).

At 812, a core network node (e.g., an MTC-IWF) may convert or encapsulate the short message into an application protocol that may be sent over an IP connection. For example, the short message may be encapsulated in an HTTP message and/or sent via CoAP protocol. The SCS may have a dedicated resource, or container for receiving the short messages (e.g., SMS messages) from the MTC-IWF. At 814, the MTC-IWF 210 may forward the SMS to the SCS 212 (e.g., over the Tsp reference point).

Figure 9:
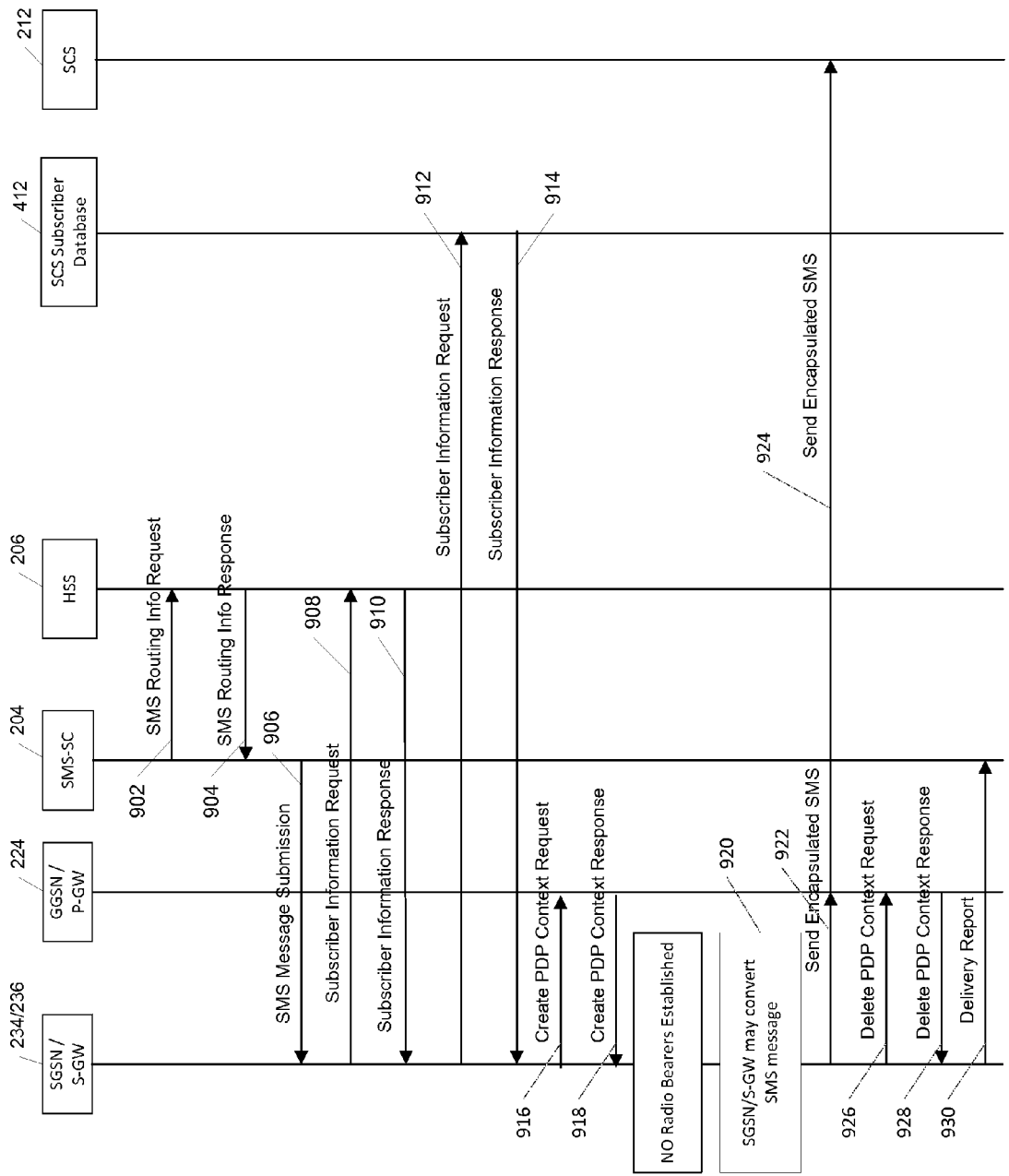
FIG. 9 illustrates an exemplary message sequence chart of a successful short message transfer attempt from a serving GPRS support node (SGSN) to a SCS via the P-GW node (path B).

FIG. 9 illustrates exemplary message sequence diagram of a successful MT short message transfer attempt, when an S-GW or SGSN is used as a serving node of the SCS. In this case, the short messages (e.g., the SMS messages) and/or other control information may be routed from the SMS-SC 204 to the S-GW 236 or SGSN 234 and forwarded to the SCS, e.g., via the gateway node (P-GW/GGSN 224).

At 902, the SMS-SC may request SMS routing information from the HSS 206. At 904, the HSS 206 may reply with the SMS routing info response. This response may include the address of the serving node. At 902 and 904, Mobile application part (MAP) messaging may be used. At 906, the SMS-SC may send the SMS message to the serving node. MAP messaging between the SMS-SC and serving nodes may be used.

At 908, the serving node may request the subscriber information from the HSS 206. The SCS may be identified by its external identifier (e.g., an MSISDN). At 910, the HSS 206 may reply with an indication that it does not recognize the device or that the device is an SCS and that the SCS Subscription database may be queried.

At 912, the serving node may request the subscriber information from the SCS subscriber database 412. The SCS may be identified by its external identifier (e.g., an MSISDN). At 914, the SCS subscriber database 412 may reply with the subscriber information. The reply may include one or more of the fields listed in Table 2. The reply may include the IP address of the SCS, the gateway node (P-GW or GGSN) that may be used, the preferred application protocol that may be used to encapsulate the short message (e.g., SMS message), or the name of the resource on the SCS where the short message may be PUT.

The SCS Subscription database 412 may be part of the HSS 206 or the serving node (e.g., SGSN/S-GW 234/246) may recognize that the MSISDN of the recipient belongs to an SCS (e.g., because SCS's may be assigned a special range of MSISDNs). In such a case, the serving node may directly query the SCS subscription database.

At 916 and 918, the serving node may establish a PDP or PDN connection with the gateway node and obtain an IP address. The sender of the short message may have an IP address assigned to it. The SGSN may use this IP address to send the SMS message to the SCS. The sender of the SMS message may have a PDP or PDN connection established. The SGSN may use this PDP or PDN connection to send the SMS message to the SCS. As the radio bearers may be established after establishing a PDP or PDN connection. In this case, there may be no need for radio bearers to be established.

At 920, a core network node (e.g., an SGSN or an S-GW) may convert or encapsulate the short message into an application protocol that may be sent over an IP connection. For example, the SMS message may be encapsulated in an HTTP message. The SMS message may be sent via CoAP protocol. The SCS may have a dedicated resource, or container for receiving SMS messages from the MTC-IWF. At 922, the serving node may send the data to the gateway node. At 924, the encapsulated SMS message may pass through the gateway node and a firewall. At 926 and 928, the serving node (e.g., SGSN/S-GW) may tear down the PDP or PDN connection with the gateway node and release the IP address. At 930, the serving node may send an SMS delivery report to the SMS-SC.

Figure 10:
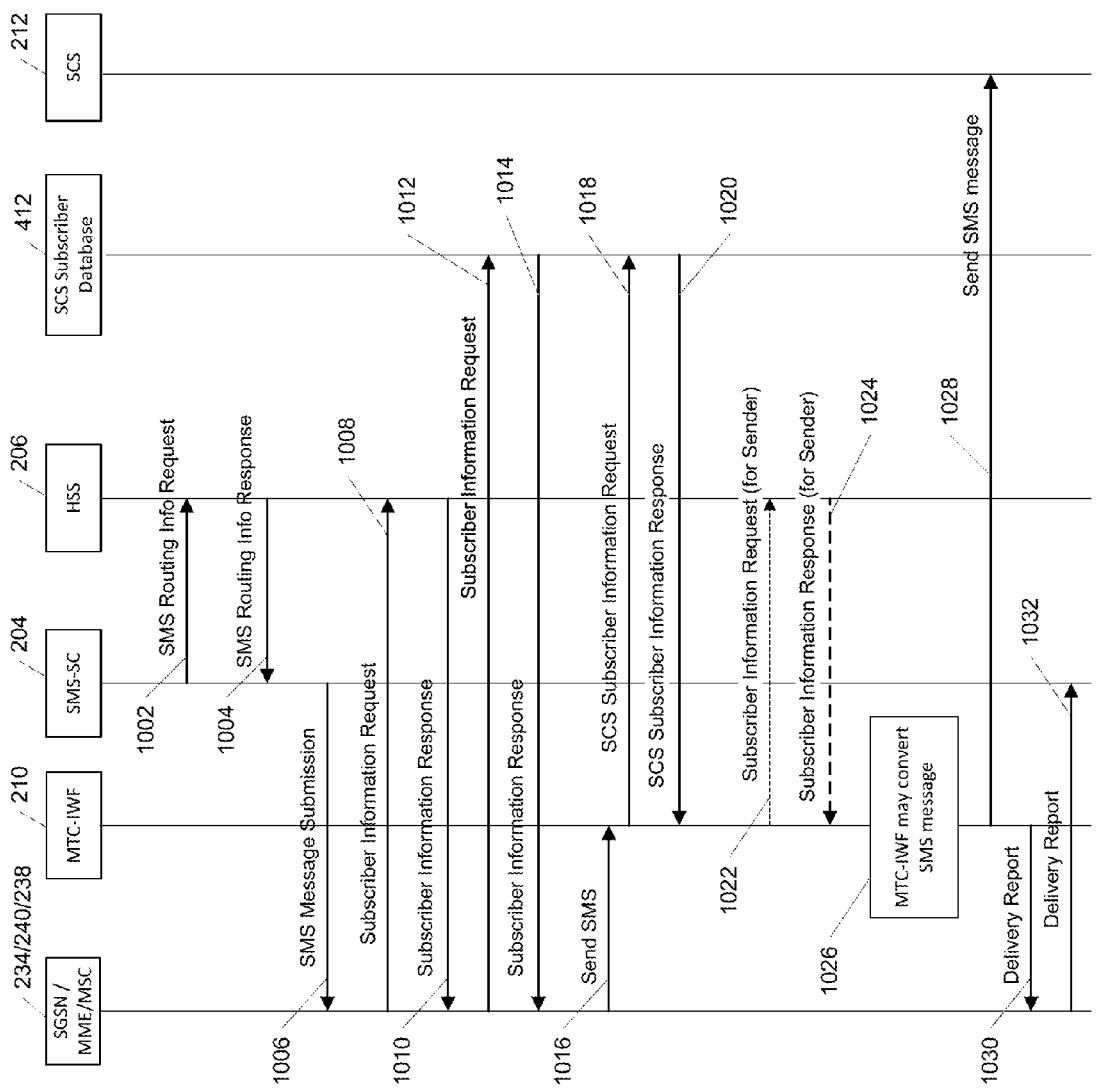
FIG. 10 illustrates an exemplary message sequence chart of a successful short message transfer attempt from a mobile switching center (MSC) to SCS via the MTC-IWF (path C).

FIG. 10 illustrates exemplary message sequence diagram of a successful MT short message transfer attempt, when an S-GW or SGSN may be used as a serving node of the SCS. In this case, the short messages (e.g., the SMS messages) and/or other control information may be routed from the SMS-SC 204 to the S-GW 236 or SGSN 234 and forwarded to the SCS, e.g., via the MTC-IWF 210.

At 1002, the SMS-SC may request SMS routing information from the HSS 206. At 904, the HSS 206 may reply with the SMS routing info response. This response may include the address of the serving node. At 1002 and 1004, MAP messaging may be used. At 1006, the SMS-SC may send the SMS message to the serving node. MAP messaging between the SMS-SC and serving nodes may be used.

At 1008, the serving node may request the subscriber information from the HSS 206. The SCS may be identified by its external identifier (e.g., an MSISDN). At 1010, the HSS 206 may reply with an indication that it does not recognize the device or that the device is an SCS and that the SCS Subscription database may be queried.

At 1014, the SCS subscriber database 412 may reply with the subscriber information. The reply may include one or more of the fields listed in Table 2. The reply may include the IP addresses of the SCS and the serving node (MTC-IWF) that may be used, the preferred application protocol that may be used to encapsulate the SMS message, or the name of the resource on the SCS where the short message may be PUT.

The SCS Subscription database 412 may be part of the HSS 206 or the serving node (e.g., SGSN/S-GW 234/246) may recognize that the MSISDN of the recipient belongs to an SCS (e.g., because SCS's may be assigned a special range of MSISDNs). In such a case, the serving node may directly query the SCS subscription database.

If the SCS Subscription database is part of the HSS or SCS's are assigned a special range of MSISDN's, the serving node, (e.g., SGSN, MME, or MSC) may directly query the SCS database. At 1016, the serving node 234/240/238 may send the short message to the MTC-IWF 210, e.g., via the T5a/b/c reference points.

At 1018, the MTC-IWF 210 may request the SCS subscriber information from the SCS subscriber database. The SCS may be identified by an external identifier (e.g., an MSISDN). At 1020, the SCS subscriber database may reply with the subscriber information. The reply may include one or more of the fields listed in the exemplary Table 2. The reply may include the IP address of the SCS, the preferred application protocol to be used to send the data to the SCS, the security keys to be used when sending the message to the SCS, and the name of the resource on the SCS where the short message may be PUT.

At 1022, the MTC-IWF may request the IP address of the MTC UE that submitted the SMS. At 1024, the MTC-IWF may receive the IP address of the MTC UE that submitted the SMS.

At 1026, a core network node (e.g., an MTC-IWF) may convert or encapsulate the short message into an application protocol that may be sent over an IP connection. For example, the short message may be encapsulated in an HTTP message. The SMS message may be sent via CoAP protocol. The SCS may have a dedicated resource, or container for receiving SMS messages from the MTC-IWF.

At 1028, the MTC-IWF may use the Tsp reference point to send the short message to the SCS. The SMS message may be encapsulated in the selected application protocol. The MTC-IWF may send the data with its own IP address or if MTC-IWF obtained IP address of the MTC UE, the MTC-IWF may serve as a proxy for the MTC UE and send the data with the IP address of the MTC UE.

At 1030, the MTC-IWF 210 may submit a delivery report to the serving node. At 1032, the serving node (e.g., SGSN, MME, or MSC) may submit a delivery report to the SMS-SC. The serving node may bypass the MTC-IWF by creating a reference point that may connect the serving node directly to the SCS. The serving node may pass the short message directly to the SCS.

Although features and elements are described above in particular combinations, one of ordinary skill in the art may appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of routing a short message, the method comprising:
   a machine type communication inter-working function (MTC-IWF) node receiving via a T4 interface the short message from an SMS service center (SMS-SC) for delivery to a service capability server (SCS) or an application server (AS);
   the MTC-IWF node sending a subscription information request to a home subscriber server (HSS), wherein the subscription information request includes a query to obtain a public identifier associated with an SMS sender of the short message;
   the MTC-IWF node receiving a subscription information reply from the HSS, wherein the subscription information reply comprises the public identifier of the SMS sender; and
   the MTC-IWF node sending the short message along with the received public identifier of the SMS sender to the SCS or the AS.

2. The method of claim 1, further comprising the MTC-IWF node sending a delivery report associated with the short message to the SMS-SC.

3. The method of claim 1, wherein the short message is an SMS message.

4. The method of claim 1, wherein the received public identifier of the SMS sender is an IP address.

5. The method of claim 1, further comprising the MTC-IWF node encapsulating the short message in a hypertext transfer protocol (HTTP) message, wherein the MTC-IWF node sends the encapsulated HTTP message to the SCS or the AS via an interface.

6. A machine type communication inter-working function (MTC-IWF) node comprising:
   a processor configured to:
      receive via a T4 interface a short message from an SMS service center (SMS-SC) for delivery to a service capability server (SCS) or an application server (AS);
      send a subscription information request to a home subscriber server (HSS), wherein the subscription information request includes a query to obtain a public identifier of an SMS sender associated with the short message;
      receive a subscription information reply from the HSS, wherein the subscription information reply comprises the public identifier of the SMS sender; and
      send the short message along with the received public identifier of the SMS sender to the SCS or the AS.

7. The MTC-IWF node of claim 6, wherein the processor is further configured to send a delivery report associated with the short message to the SMS-SC.

8. The MTC-IWF node of claim 6, wherein the short message is an SMS message.

9. The MTC-IWF node of claim 6, wherein the received public identifier of the SMS sender is an IP address.

10. The MTC-IWF node of claim 6, wherein the processor is configured to encapsulate the short message in a hypertext transfer protocol (HTTP) message, wherein the MTC-IWF node sends the HTTP message to the SCS or the AS via an interface.

11. The method of claim 1, wherein the subscription information request is sent or the subscription information reply is received via an S6m interface.

12. The MTC-IWF node of claim 6, wherein the subscription information request is sent or the subscription information reply is received via an S6m interface.

13. The method of claim 1, wherein the MTC-IWF node sends the short message to a dedicated resource on the SCS.

14. The MTC-IWF node of claim 6, wherein the MTC-IWF node sends the short message to a dedicated resource on the SCS.

15. The method of claim 1, wherein the MTC-IWF node sends the short message to the SCS using the public identifier of the SMS sender.

16. The MTC-IWF node of claim 6, wherein the processor is further configured to send the short message to the SCS using the public identifier of the SMS sender.

* * * * *